US006404705B1

(12) United States Patent
Watanabe et al.

(10) Patent No.: US 6,404,705 B1
(45) Date of Patent: Jun. 11, 2002

(54) MAGNETO-OPTICAL DISK APPARATUS HAVING AN ADJUSTMENT MECHANISM FOR SETTING THE POSITION OF MAGNETIC HEADS

(75) Inventors: Hitoshi Watanabe; Norio Ohta, both of Ibaraki-ken; Masashi Suenaga, Toride, all of (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 09/042,020

(22) Filed: Mar. 13, 1998

(30) Foreign Application Priority Data

Mar. 14, 1997 (JP) .............................. 9-061275

(51) Int. Cl.$^7$ .............................................. G11B 11/00
(52) U.S. Cl. .............................. 369/13.14; 369/13.17; 369/53.28
(58) Field of Search ........................ 369/13, 77.2, 75.2, 369/77.1, 13.1, 13.14, 44.32, 33.28, 13.17, 13.2; 360/105, 114, 59, 66

(56) References Cited

U.S. PATENT DOCUMENTS

| | | | | |
|---|---|---|---|---|
| 5,062,019 A | * | 10/1991 | Morisawa | 360/106 |
| 5,309,421 A | * | 5/1994 | Fujisawa | 369/77.1 |
| 5,353,278 A | * | 10/1994 | Murakami et al. | 369/290 |
| 5,408,455 A | * | 4/1995 | Takishima | 369/44.32 |
| 5,416,753 A | * | 5/1995 | Kanazawa et al. | 369/13.17 |
| 5,434,831 A | * | 7/1995 | Ishii et al. | 369/13.14 |
| 5,557,589 A | * | 9/1996 | Mukawa et al. | 369/13.2 |
| 6,101,153 A | * | 8/2000 | Shimazaki et al. | 369/13.1 |

FOREIGN PATENT DOCUMENTS

| | | |
|---|---|---|
| JP | 63-217548 | 9/1988 |
| JP | 1-287851 | 11/1989 |
| JP | 3-125355 | 5/1991 |
| JP | 4-212703 | 8/1992 |
| JP | 8-273231 | 10/1996 |

\* cited by examiner

*Primary Examiner*—Ali Neyzari
(74) *Attorney, Agent, or Firm*—Birch, Stewart, Kolasch & Birch, LLP (57) ABSTRACT

A magneto-optical disk apparatus and an adjustment method of a head mechanism are provided for strictly and quickly adjusting a setting position of a magnetic head with respect to an optical axis of an optical head. The adjustment method is executed by the following steps. A magnetic super resolution type magneto-optical disk is mounted to the magneto-optical disk apparatus provided with the optical head and the magnetic head. Then, an external magnetic field from the magnetic head is applied onto the magneto-optical disk as applying a laser beam of a reproduction level onto the magneto-optical disk. Then, a reproduction signal output read from the magneto-optical disk is detected concurrently with the application of the external magnetic field. Next, a fine adjustment mechanism is operated so that the reproduction signal output is made maximum with respect to the direction of the external magnetic field, for the purpose of sequentially changing a setting position of the magnetic head with respect of the optical axis of the optical head.

12 Claims, 6 Drawing Sheets

MAGNETO-OPTICAL DISK APPARATUS HAVING AN ADJUSTMENT MECHANISM FOR SETTING THE POSITION OF MAGNETIC HEADS

BACKGROUND OF THE INVENTION

The present invention relates to a magneto-optical disk apparatus and a position adjustment method of a head mechanism which is mounted in the magneto-optical disk apparatus. More particularly, the present invention relates to the magneto-optical disk apparatus which is preferable to improvement of a recording frequency and the position adjustment method of a head mechanism which is arranged to adjust a relative position of a magnetic head against an optical head, both of which heads are mounted in the magneto-optical disk apparatus.

Like a magnetic disk such as a floppy disk, the magneto-optical disk has been heretofore put into practice as an information recording medium from or on which information may be repetitively recorded, reproduced and erased. This magneto-optical disk is arranged to magnetically record data on a magnetic layer by virtue of an external magnetic field with heat caused by a laser beam. The magneto-optical disk apparatus for this type of magneto-optical disk generally includes an optical head for focusing a laser beam as a beam spot on the magnetic layer of the magneto-optical disk and a magnetic head for applying an external magnetic field onto the magnetic layer, the magnetic head located as opposed to the optical head.

The laser beam spot applied onto the magnetic layer has a diameter of 1 to 3 $\mu$m, while the main magnetic pole composing the magnetic head is sized to be as large as 100 to 300 $\mu$m. In this composition, it has been enough to position the magnetic head in the specific range of the laser beam target section where the necessary magnetic field for recording or erasing information may be applied without having to strictly match the axial center of the main magnetic pole to the optical axis of the optical head.

Figure 7A:
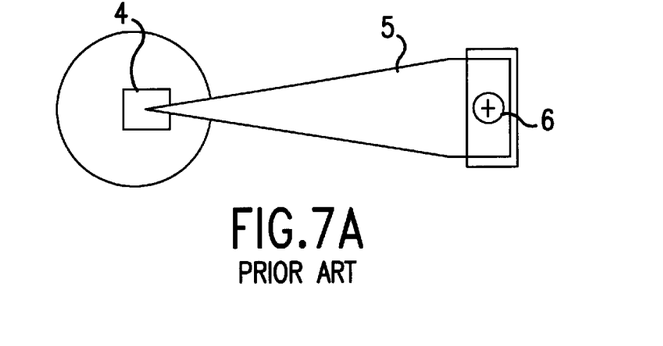
FIG. 7A is a plan view showing the prior art.
Figure 7B:
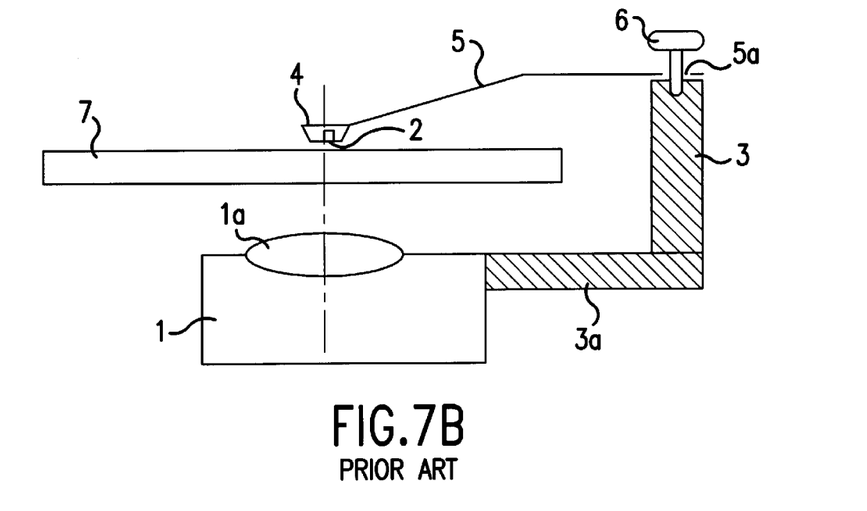
FIG. 7B is a sectional view showing an essential portion of the prior art.

Hereafter, the description will be oriented to the construction of the head mechanism of the conventional magnetic-optical disk apparatus and the adjustment method of the magnetic head against the optical axis of the optical head with reference to FIGS. 7A and 7B showing the plan view and the front view.

As shown in FIGS. 7A and 7B, the optical head 1 is mounted at one tip of an arm 3 formed in a horseshoe manner and the magnetic head 2 is mounted at the other tip of an arm 3. The optical head 1 is opposed to the magnetic head 2. The optical head 1 is secured to a lower arm 3a with an objective lens 1a directed upward. The objective lens 1a provides an actuator (not shown) for auto-focusing and tracking control. By operating the actuator, it is possible to properly change the position of the laser beam spot. On the other hand, the magnetic head 2 is mounted on a slider 4. The slider 4 is mounted on the upper end of the arm 3 with a gimbal spring 5 laid therebetween.

The gimbal spring 5 is fixed on the upper end of the arm 3 by means of a screw 6. The gimbal spring 5 has a through hole 5a whose diameter is far larger than that of the screw 6. Hence, a larger washer (not shown) than the through hole 5a is fitted into the through hole 5a. Before fastening the screw, the setting position of the magnetic head 2 against the optical head (more strictly, the objective lens 1a) may be adjusted in the allowance range. Further, the arm 3 is linearly moved in the radial direction of the magneto-optical disk 7 by means of the driving device (not shown). Or, the arm 3 is driven arcuately so that the head setting section is moved substantially in the radial direction of the magneto-optical disk 7 with the arm end linked at the given position of the magneto-optical disk apparatus as a supporting point.

In this construction, the adjustment of the setting position of the magnetic head 2 is carried out by mounting the magneto-optical disk 7 to the magneto-optical disk apparatus and repeating the recording of information on the magneto-optical disk 7 and the reproduction of information therefor. That is, when the assembly of the magneto-optical disk apparatus is terminated, the magneto-optical disk 7 is mounted to the magneto-optical disk apparatus so that the magnetic head 2 operates to generate a magnetic field of a predetermined recording intensity as the optical head 1 is applying a laser beam of a recording intensity, for recording information on the magneto-optical disk 7. Next, the drive of the magnetic head 2 is stopped and then the intensity of the laser beam applied from the magneto-optical disk 7 is switched into a reproducing intensity on which the recorded information is reproduced. If the output of the reproduction signal detected by the optical head 1 does not reach a predetermined value, it is grasped that the external magnetic field of the predetermined intensity is not applied to the magnetic layer because of the improper setting position of the magnetic head 2. Then, the mounting location of the gimbal spring 5 against the upper arm 3b is changed by loosening the screw 6. Until the reproduction signal reaches the output of the predetermined value or more, the foregoing operations are repeated.

In the field of the magneto-optical recording, one of the most significant technical issues is improvement of a recording frequency. For improving the recording frequency, it is indispensable to reduce the magnetic head 2 in size. The reduced magnetic head 2 leads to narrowing the distribution of a magnetic field generated by the magnetic pole, which needs to more precisely position the magnetic head 2 against the optical axis of the optical head.

However, the conventional mechanism for adjusting the position of the magnetic head does not provide a fine adjustment mechanism for the magnetic head. It means that the conventional adjustment mechanism has difficulty in positioning the magnetic head 2 against the optical axis of the optical head with precision, so that the position adjustment of the magnetic head is not made high-efficient. Moreover, the foregoing conventional adjustment method of the magnetic head needs to actually record information on the magneto-optical disk, which may suffer from erroneous erasion of information to be saved.

SUMMARY OF THE INVENTION

The present invention is made to overcome the foregoing difficulties, and it is an object of the present invention to provide a magneto-optical disk apparatus and an adjustment method of a head mechanism which are arranged to strictly and quickly adjust the setting position of a magnetic head against an optical axis of an optical head.

In order to overcome the foregoing difficulties, according to the invention, at first, a magneto-optical disk apparatus for locating an optical head for focusing a laser beam as a beam spot on a magnetic layer of each side of the magneto-optical disk as opposed to the magnetic head for applying an external magnetic field on the magnetic layer is constructed to provide a fine adjustment mechanism for adjusting the setting position of the magnetic head against the optical axis of the optical head in an arm mechanism for holding the magnetic head.

As the fine adjustment mechanism, there may be considered a member containing a gimbal spring in parallel to the magnetic head and the slider is slidably mounted with the arm mechanism so that the member may be slid by the arm mechanism. This type of fine adjustment mechanism of the magnetic head allows the magnetic head to move in the desired direction step by step. Hence, this type of fine adjustment mechanism enables to adjust the setting position of the magnetic head against the optical axis of the optical head more quickly and precisely than the conventional adjustment mechanism in which the setting position of the magnetic head is changed by using a clearance of the screw through hole opened in the gimbal spring.

Second, like the above, the magneto-optical disk apparatus is constructed to mount a plurality of magnetic heads adjacently to one slider and provide a head driving device for individually driving these magnetic heads.

The mount of these magnetic heads adjacent to one slider allows the magnetic head to be set to the position at which the most excellent recording and reproducing characteristics are made fully effective without having to adjust those magnetic heads one by one. This mount therefore makes the assembly or maintenance of the magneto-optical disk apparatus easier.

Third, like the above, the magneto-optical disk apparatus is constructed to provide a photo detector for detecting a laser beam applied by the optical head and passed through the magneto-optical disk in the magnetic head or the slider for holding the magnetic head.

In this construction, the photo detector is mounted on the disk-opposed side of the magnetic head or the slider so that a light acceptance plane is directed to the disk plane of the magneto-optical disk for the purpose of directly detecting the laser beam passed through the magneto-optical disk. Or, the photo detector is mounted at any location of the magnetic head or the slider so that the light acceptance plane is directed in any direction, for the purpose of detecting the beam entered into an optical fiber located on the disk-opposed plane of the magnetic head or the slider and passed through the magneto-optical disk In order to enhance the intensity of the reflected light, a reflection layer made of metal or the like is generally laminated on a magnetic layer of the magneto-optical disk. However, if the magneto-optical disk contains a reflection layer, about several percents of laser beam for recording and reproduction is passed through the reflection layer. Hence, by providing the photo detector in the magnetic head or the slider and detecting the light passed through the magneto-optical disk, it is possible to derive the relative position of the magneto-optical disk of the laser beam spot against the magnetic head, for the purpose of facilitating the adjustment of the setting position of the magnetic head.

It goes without saying that the magneto-optical disk apparatus provided with the photo detector may have a fine adjustment mechanism for adjusting the setting position of the magnetic head against the optical axis of the optical head.

On the other hand, an adjustment method of a setting position of a magnetic head against an optical axis of an optical head, at first, comprises the steps of mounting a magneto-optical disk having a magnetic layer for reversing the direction of magnetization toward an external magnetic field when the external magnetic field of a given intensity is applied onto the magneto-optical disk as applying the laser beam of the reproduction level thereon in the magneto-optical disk apparatus provided with an optical disk and a magnetic disk, applying the external magnetic head from the magnetic field as applying the laser beam of the reproduction level onto the magneto-optical disk, detecting the output of the reproduction signal from a signal reproducing section provided in the magneto-optical disk apparatus concurrently with the application of the magnetic field, and changing the setting position of the magnetic head against the optical axis of the optical head so that the output of the reproduction signal is made maximum about the direction of the external magnetic field.

The magneto-optical disk may be a magnetic super resolution type disk. The magnetic super resolution type magneto-optical disk provides three magnetic layers, that is, a recording layer, a cutting layer and a reproducing layer. When the laser beam of the reproduction level is applied onto the magneto-optical disk, the magnetization of the cutting layer is cancelled so that the recording layer is magnetically independent of the reproduction layer. By applying the external magnetic field, therefore, the magnetizing direction of the reproduction layer is inverted toward the external magnetic field. The highest magnetization of the reproduction layer takes place at the main magnetic pole of the magnetic head, so that the output of the reproduction signal from the optical head is proportional to the magnitude of the magnetization of the reproduction layer. Hence, by adjusting the setting position of the magnetic head so that the reproduction signal output is made maximum about the direction of the external magnetic field, whatever the main magnetic pole of the magnetic head may be reduced in size, it is possible to precisely oppose the main magnetic pole of the magnetic head to the optical axis of the optical head, thereby quickly and precisely adjusting the setting position of the magnetic head.

In this construction, the setting position of the magnetic head may be changed by operating the fine adjustment mechanism provided in the arm mechanism for holding the magnetic head. When determining the setting position of the magnetic head, after specifying the position at which the reproduction signal output is made maximum about the direction of the external magnetic field, preferably the actuator for tracking control provided in the optical head is operated for scanning a laser beam spot equally on an inner peripheral side and an outer peripheral side with the target track from which the reproduction signal output is detected as a center and for keeping the maximum reproduction signal output about the direction of the external magnetic field over a given scan width. By this operation, it is possible to easily know whether or not the peak of the external magnetic field (that is not an acute peak but a stable area according to the magnitude of the magnetic pole) matches to the center of the track from which the reproduction signal output is detected. This allows the setting position of the magnetic head to be adjusted more precisely.

Second, like the above, the adjustment method of a head mechanism comprises the steps of mounting to the magneto-optical disk apparatus having an optical head and a plurality of magnetic heads mounted to the slider a magneto-optical disk having the magnetic layer for reversing the direction of magnetization toward the external magnetic field when the external magnetic field of a given intensity is applied as applying the laser beam of a reproduction level, applying the external magnetic field sequentially from the magnetic heads as applying the laser beam of the reproduction level onto the magneto-optical disk, detecting a reproduction signal output from a signal reproduction section provided in the magneto-optical disk apparatus concurrently with the application of the magnetic field, and selecting the magnetic head for keeping the reproduction signal output maximum about the direction of the external magnetic field.

The foregoing method does not need the movement operation of the magnetic head, so that the setting position of the magnetic head may be more easily adjusted.

Third, the adjustment method of a head mechanism comprises the steps of mounting a magneto-optical disk to a magneto-optical disk apparatus having an optical head and a magnetic head and a photo detector for detecting a laser beam applied by the optical head onto the magnetic head or a slider for holding the magnetic head and passed through the magneto-optical disk, detecting an output signal of the photo detector as applying a laser beam of a reproduction level onto the magneto-optical disk, and changing the setting position of the magnetic head against the optical axis of the optical head as keeping the output signal at a given level.

The foregoing method does not need to rotatively drive the magneto-optical disk and detect the reproduction signal output, which enables to more easily adjust the setting position of the magnetic head. In this aspect of the invention, the setting position of the magnetic head may be changed by operating the fine adjustment mechanism provided in the arm mechanism for holding the magnetic head.

DESCRIPTION OF THE PREFERRED EMBODIMENTS

Hereafter, the description will be oriented to a magneto-optical disk apparatus according to an embodiment of the present invention with reference to the appended drawings.

Figure 1A:
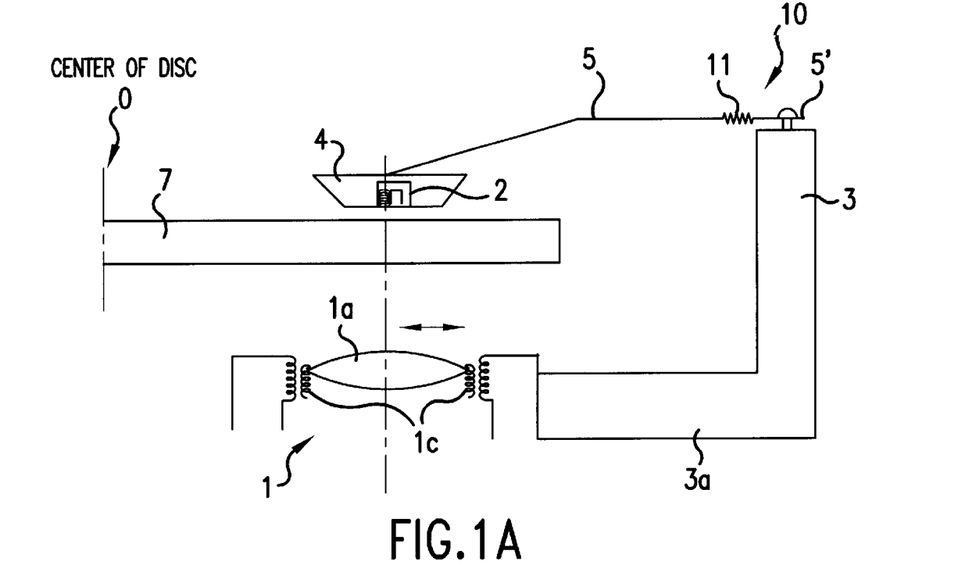
FIG. 1A is a sectional view showing an essential portion of a magnetic head and an optical head included in an embodiment of the invention.
Figure 1B:
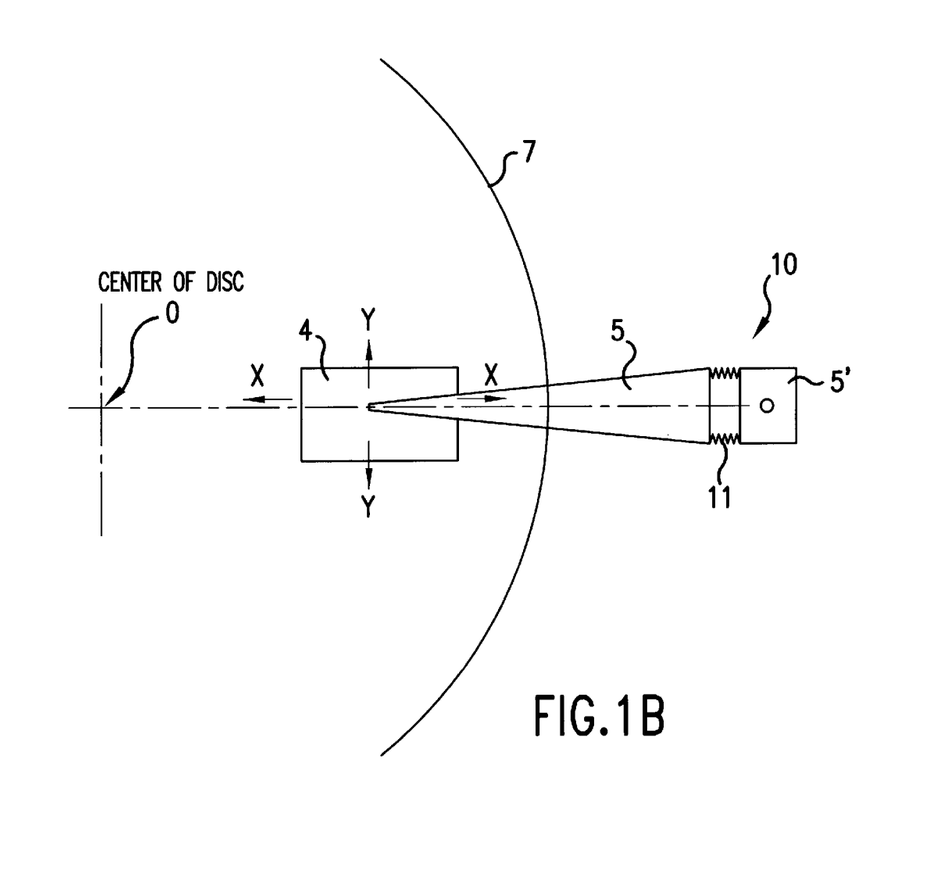
FIG. 1B is a plan view showing the essential portion of the magnetic head and the optical head included in the embodiment.

FIG. 1A is a sectional plan view showing an essential portion of a magneto-optical disk for embodying the present invention. FIG. 1B is a plan view showing the essential portion of the magneto-optical disk. In these figures, a numeral 10 denotes a position adjusting section. A numeral 11 denotes a fine adjustment mechanism composed of a piezoresistance element. The other components corresponding to those shown in FIGS. 7A and 7B described below have the same reference numbers as those of FIGS. 7A and 7B.

The position adjusting section 10 is composed of a pair of piezoresistance elements 11, 11 provided between a base 5' of a gimbal spring mounted on the top of the arm 3 and the gimbal spring body 5.

These piezoresistance elements 11, 11 are connected to a given driving circuit (not shown). The application of an inphase driving voltage onto these piezoresistance elements 11, 11 allows the gimbal spring body 5 and a slider mounted at the tip of the gimbal spring body to be displayed in the radial direction (X—X). The application of the driving voltages onto the piezoresistance elements 11, 11 in reverse phases to each other allows the gimbal spring body 5 to be rocked in the direction of Y—Y and thereby the slider 4 to be displayed in the direction of Y—Y.

Consequently, the application of the proper driving voltage onto the piezoresistance elements allows a magnetic head 2 mounted to the slider 4 to be adjustably positioned with respect to the optical axis of the optical head 1 in the radial direction (X—X) and the peripheral direction (Y—Y).

In the embodiment shown in FIGS. 1A and 1B, an objective lens 1a composing the optical lens 1 is supported through an electromagnetic coil 1c. The application of a proper driving voltage onto the coil 1c allows the objective lens 1a to be fine adjusted in the radial direction of the objective lens 1a. This construction therefore enables to compensate for the expansion of the gimbal spring 5 caused by aging.

Figure 2:
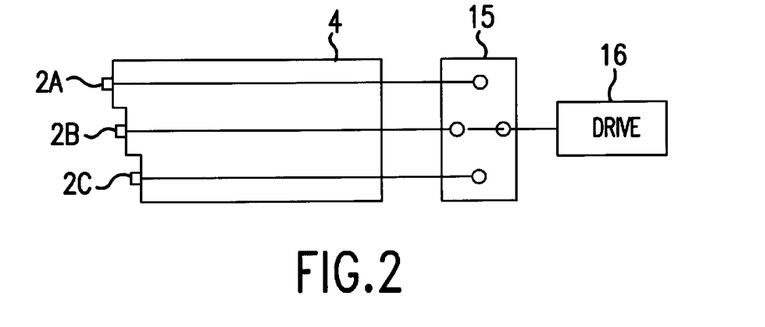
FIG. 2 is a view showing a slider provided with a plurality of magnetic heads included in an embodiment of the invention.

FIG. 2 is a plan view showing a construction of a magnetic head device applied to the magnetic disk apparatus according to another embodiment of the invention. As is obvious from FIG. 2, the magnetic head device includes magnetic heads 2A, 2B, 2C mounted at their own positions with the slider 4. These magnetic heads 2A, 2B, 2C are connected to a driving device 16 through a selector 15 for selecting one of those magnetic heads. Each of the magnetic heads 2A, 2B, 2C is provided with a piezoresistance element (not shown) as shown as the gimbal spring 5 in FIGS. 1A and 1B. Hence, the application of a given driving voltage from the driving device 16 onto any one of the magnetic heads 2A, 2B, 2C selected by the selector 15 allows the selected magnetic head to be adjustably positioned.

FIGS. 3A to 3G are sectional views showing an essential portion of the magneto-optical disk apparatus according to another embodiment of the invention and an output waveform views thereof. In this embodiment, the magneto-optical disk apparatus is characterized to include a magnetic head 2, the slider 4, and a photo detector 21 for detecting a laser beam applied from the optical head 1 and passed through a magneto-optical disk 7.

Figure 3A:
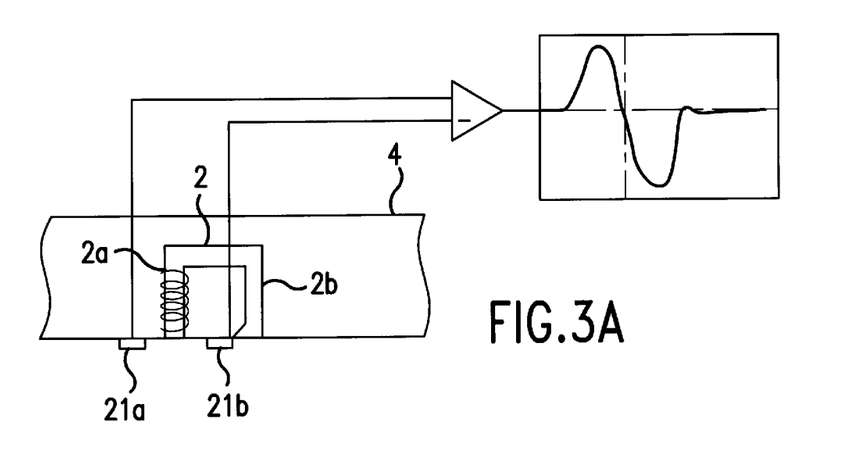
FIG. 3A is a sectional view showing an essential portion of an embodiment having a photo detector provided on the bottom of a slider in combination with a waveform chart of an output.
Figure 3B:
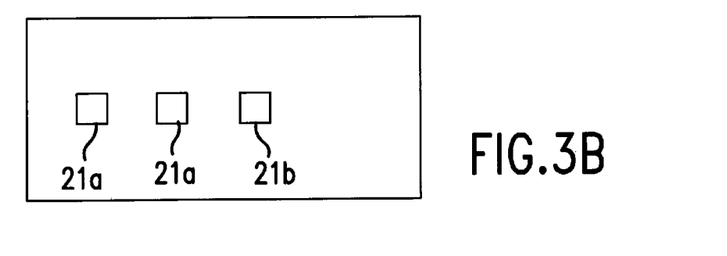
FIG. 3B is a bottom view showing the slider included in the embodiment.

The magneto-optical disk apparatus shown in FIG. 3A is constructed to mount two photo detectors 21a and 21b in the radial direction of the disk and in a manner to direct their light acceptance planes to the disk plane of the magneto-optical disk 7. Those photo detectors 21a and 21b are mounted on the disk-opposite plane of the slider 4 where a main magnetic pole 2a and a sub magnetic pole 2b of the magnetic head are formed. Those photo detectors are located on both sides of the main magnetic pole 2a and at given equal distances from the main magnetic pole 2a. FIG. 3B is a bottom view showing the slider 4 shown in FIG. 3A, in which the photo detectors 21a and 21b are located radially with the main magnetic pole 2a as a center and at equal distances from the main magnetic pole 2a.

As schematically shown in FIG. 3A, the light outputs detected by the two photo detectors 21a, 21b are processed by a given adder. Observing the output waveform, it is determined that a zero cross of the output waveforms of the photo detectors 21a, 21b located on both sides of the main magnetic pole 2a and at equal distances therefrom.

Figure 3C:
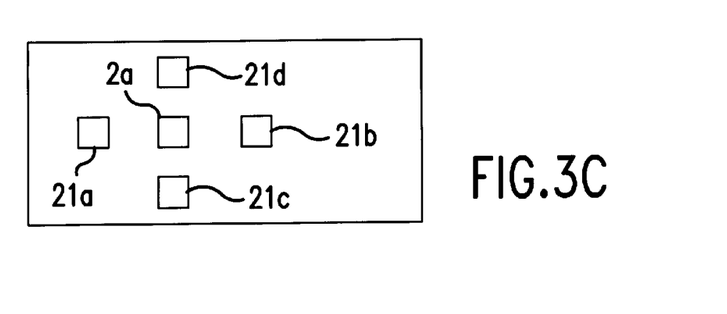
FIG. 3C is a bottom view of the slider showing the arrangement of the embodiment having four photo detectors located in the disk radial and peripheral direction of the slider bottom.
Figure 3D:
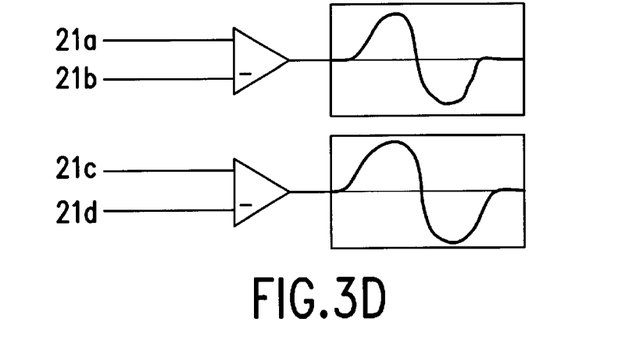
FIG. 3D is a waveform chart of a detection waveform processed in the embodiment shown in FIG. 3C.

The construction shown in FIGS. 3C and 3D includes photo detectors 21c and 21d located radially of the disk and at given equal distances from the main magnetic pole 2a on the bottom of the slider 4, which corresponds to the center of the photo detectors, in addition to the construction shown in FIGS. 3A and 3B. The resulting construction includes four photo detectors 21a, 21b, 21c, 21d located radially and peripherally of the disk and at equal distances from the main magnetic pole 2a, which corresponds to the center of the photo detectors. As shown in FIG. 3D, by checking the intensity of the detected light through a proper adder in light of the waveform, it is grasped that the main magnetic pole 2a is positioned at a zero cross of both waveforms.

Figure 3E:
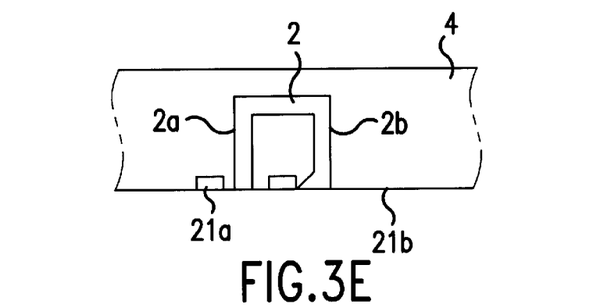
FIG. 3E is a view showing an embodiment in which a photo detector is buried on the bottom of the slider.
Figure 3F:
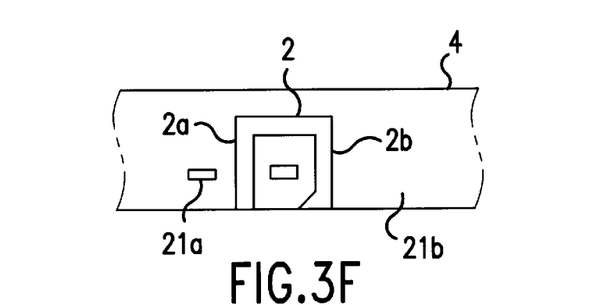
FIG. 3F is a sectional view showing an embodiment in which a slider is composed of a transparent body and a photo detector is buried in the slider.
Figure 3G:
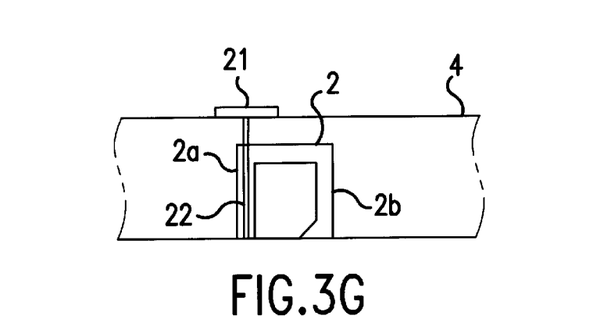
FIG. 3G is a sectional view showing an embodiment in which a photo detector is located on the opposite side of the slider to the magneto-optical disk and a laser beam from the magneto-optical disk is guided through an optical fiber.

Further, FIGS. 3E, 3F and 3G show the transformations of the mounting position of the photo detector 21 against the slider 4. FIG. 3E shows the construction where the photo detectors 21a and 21b are buried in the slider 4.

In the construction shown in FIG. 3F, the slider 4 is formed of a transparent material. The photo detectors 21a and 21b are buried in the transparent slider 4 in a manner to direct the light acceptance plane to the disk plane of the magneto-optical disk.

Further, in the construction shown in FIG. 3G, the photo detector 21 is located on the opposite side of the slider 4 to the magneto-optical disk 7. An optical fiber 22 is penetrated through a through hole of the main magnetic pole 2a so that an incident ray from the disk side of the slider 4 is guided to the photo detector located on the opposite side of the slider 4.

Figure 4A:
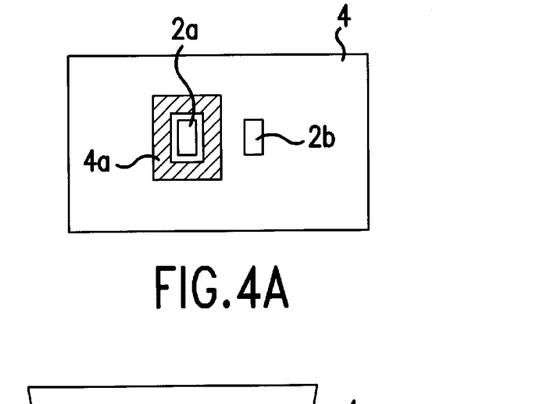
FIG. 4A is a view showing a construction of an embodiment in which a peripheral portion of a main magnetic pole of a slider bottom is formed of a member with a high reflection factor.
Figure 4B:
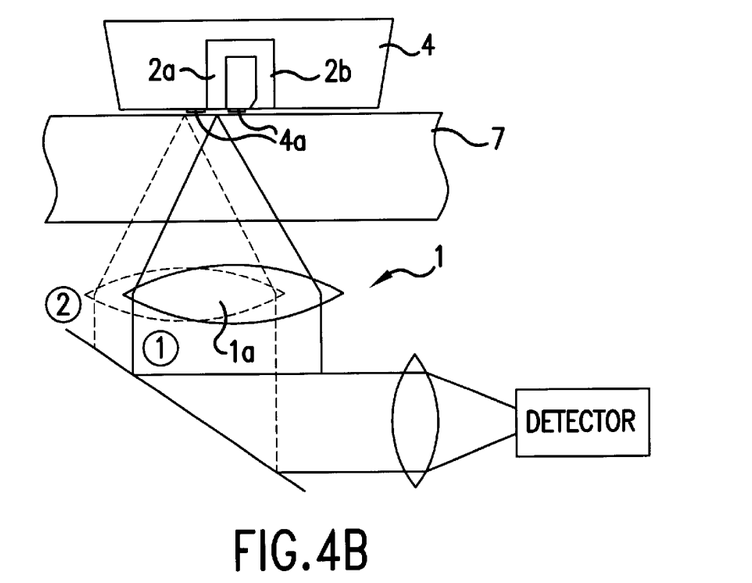
FIG. 4B is a view of an essential portion for showing a construction of the magnetic head and the optical head of the embodiment shown in FIG. 4A for detecting the magnetic head position.
Figure 4C:
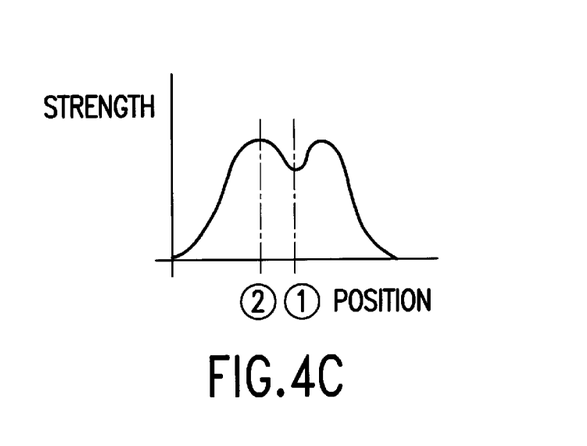
FIG. 4C is a view showing a light intensity waveform detected by the constructions shown in FIGS. 4A and 4B.

FIG. 4A is a bottom view of a slider showing another construction of the magnetic head and the slider. FIG. 4B is a sectional view showing an essential portion of an optical head opposed to the slider through the magneto-optical disk. FIG. 4C shows a waveform of a detection signal given by the optical head. In this embodiment, the highly reflective coating 4a is formed on the area around the main magnetic pole 2a of the opposite side of the slider 4 to the magneto-optical disk 7. As shown in FIG. 4B, the fine adjustment mechanism (FIGS. 1A and 1B) of the gimbal spring for supporting the slider 4 or the fine adjustment mechanism for the objective lens 1a is served to adjust the relative position of the magnetic head 2 in the radial direction of the disk. The valley at this time between two mountains of the signal output reproduced by the optical head shown in FIG. 4C can be grasped as the position of the main magnetic pole 2a.

Like the foregoing embodiments, the construction of this embodiment shown in FIGS. 4A, 4B and 4C makes it possible to adjust the relative position of the magnetic head 2 against the optical head 1 in the radial and the peripheral directions of the magneto-optical disk 7, because a highly reflective portion 4a is formed on the overall periphery of the slider 4 toward the main magnetic pole 2a.

In turn, the description will be oriented to an adjustment method of a magnetic head.

A magnetic super resolution type magneto-optical disk is mounted to the magneto-optical disk apparatus having the optical head 1 and the magnetic head 2.

Figure 5:
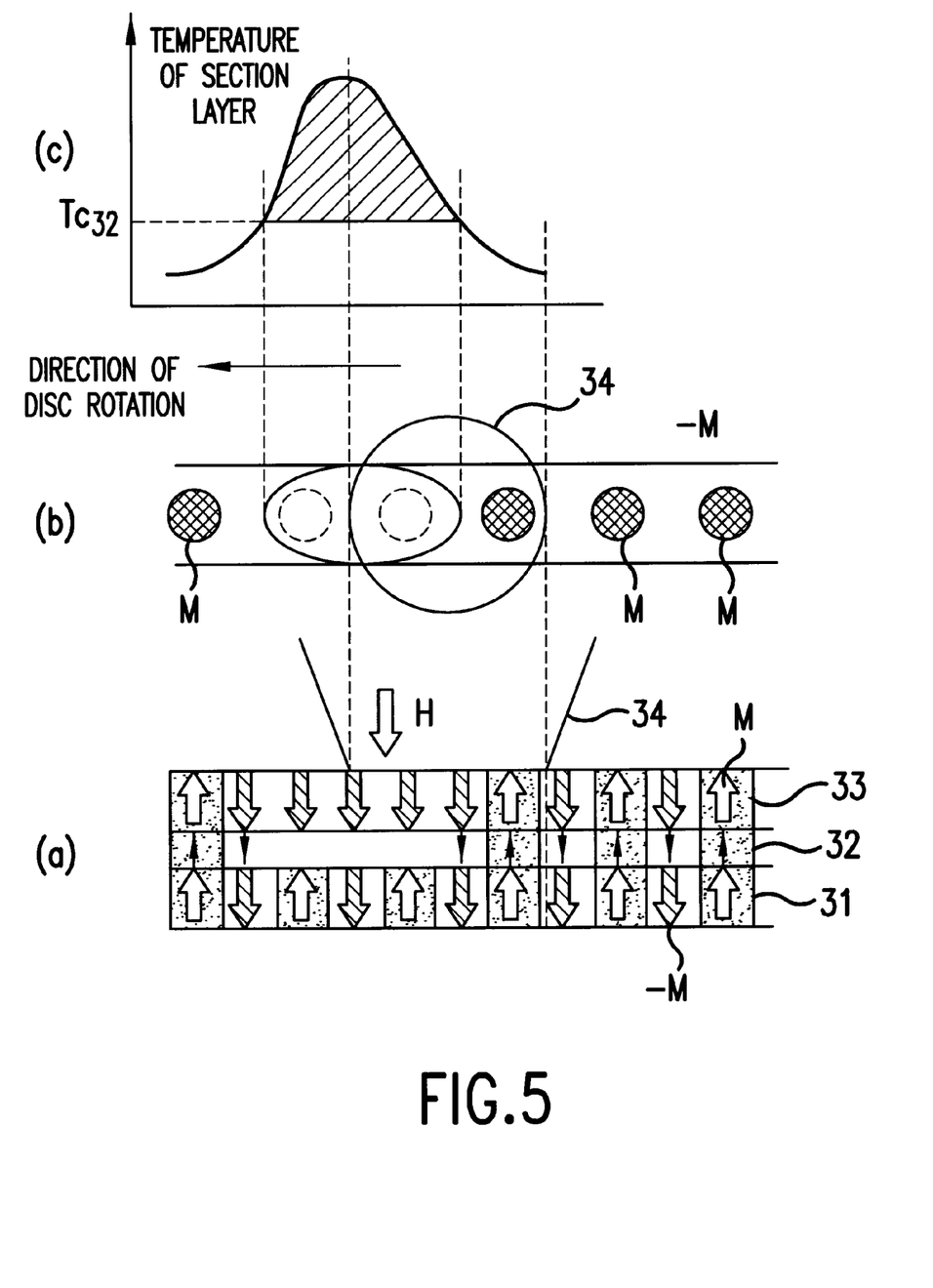
FIG. 5 is an explanatory view showing a recording and reproduction structure of a magnetic super resolution disk.

As shown in (a) of FIG. 5, the magnetic super resolution type magneto-optical disk includes three magnetic layers of a recording layer 31, a cutting layer 32 and a reproducing layer 33 on a substrate (not shown). Assuming that the Curie point temperature of the recording layer 31 is $Tc_{31}$, the Curie point temperature of the cutting layer 32 is $Tc_{32}$, and the Curie point temperature of the reproducing layer 33 is $Tc_{33}$, the Curie point temperature of each magnetic layer is adjusted to have a relation of $Tc_{32} < Tc_{31} < Tc_{33}$. In a room temperature, those magnetic layers are magnetically coupled with each other. Hence, by applying a laser beam 34 having such a magnitude as disallowing recording of information on the recording layer 31 (referred to as "reproduction level" herein), the information recorded on the recording layer 31 is allowed to be reproduced. By applying a laser beam 34 of the reproduction level onto the magneto-optical disk, the magnetism on the cutting layer 32 is erased so that the recording layer 31 is magnetically independent of the reproducing layer 33. In this state, by driving the magnetic head 2 and applying an external magnetic field H to the magnetic layer, the overall direction of the magnetism of the reproducing layer 33 is reversed in the direction of the external magnetic field H.

Figure 6:
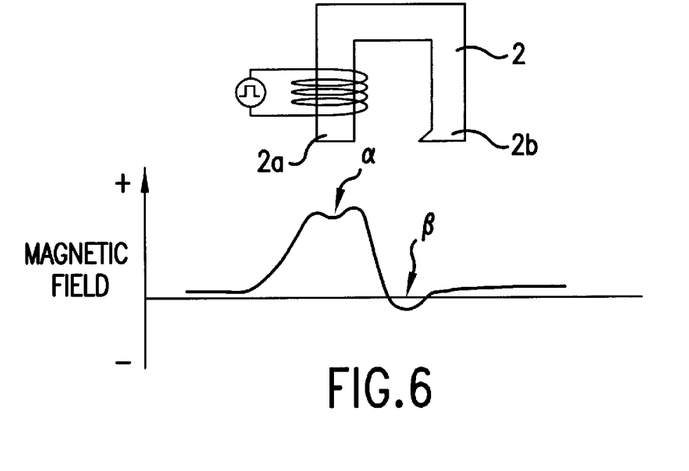
FIG. 6 is a view showing a magnetic head and a graph showing a distribution of a magnetic field applied by the magnetic head.

As shown in FIG. 6, the highest magnetism of the reproducing layer takes place at a position a of the main magnetic pole 2a of the magnetic head 2. The reproduction signal output of the optical head 1 is proportional to the magnitude of the magnetism of the reproducing layer 33. Hence, by adjusting the setting position of the magnetic head 2 so that the reproduction signal output becomes maximum about the direction of the external magnetic field, the position of the main magnetic pole 2a of the magnetic head 2 may be matched to the optical axis of the optical head 1. In this case, the setting position of the magnetic head 2 is adjusted by operating the fine adjustment mechanism 11 (see FIGS. 1A and 1B) provided in the arm 3.

At the position β of the sub magnetic pole 2b of the magnetic head 2 there appears a magnetic field of an opposite polarity to the magnetic field generated by the main magnetic pole 2a.

A larger external magnetic field may cause two inflection points as shown in FIG. 6. However, a weaker external magnetic field may cause an inflection point of α but bring the inflection point of β to zero lever, that is, cause no inflection point of β. Hence, since just one inflection point is provided, the adjustment of an optimum position is made possible.

The external magnetic field H may be a d.c. magnetic field or an a.c. magnetic field. Further, the magneto super resolution type magneto-optical disk may be a data-recorded disk or a disk with no recorded data. In the case of using the data-recorded disk, to prevent the influence of the magnetism on the recording layer 31, it is preferable to apply an a.c. magnetic field with as high a frequency as possible. This embodiment utilizes the magnetic super resolution type magneto-optical disk. In place, any magneto-optical disk may be used if it contains such a magnetic layer as inverting the direction of magnetism toward the external magnetic field when the external magnetic field of a given intensity is applied as applying a laser beam of a reproduction level.

Next, the description will be oriented to an adjustment method of magnetic head, which concerns with the method for adjusting the position of the magneto-optical disk apparatus having plural magnetic heads in one slider.

In this embodiment, by mounting the magnetic super resolution type magneto-optical disk to the magneto-optical disk apparatus, the setting position of the magnetic head can be adjusted. That is, as applying a laser beam 34 of the reproduction level onto the mounted magnetic super resolution type magneto-optical disk, the first magnetic head 2A shown in FIG. 2, for example, operates to apply an external magnetic field H of a given intensity for detecting the reproduction signal output. Next, the second and the third magnetic heads 2B and 2C operate to apply the external magnetic field H of the same intensity for detecting the reproduction signal output. Then, the magnetic head for providing the largest reproduction signal output is selected as the magnetic head set to the optimum position. Further, the fine adjustment mechanism is used for fine adjustment of the position of the magnetic head.

In turn, the description will be oriented to an adjustment method of head mechanism, which concerns with a method for adjusting the position of the magnetic head of the magneto-optical disk apparatus constructed to provide the photo detector 21 in the magnetic head 2 or the slider 4.

The method of this embodiment does not provide the operation of reproducing information from the disk. By mounting to the magneto-optical disk apparatus any magneto-optical disk except the magnetic super resolution type disk or a semitransparent disk in place of it, it is possible to adjust the setting position of the magnetic head. That is, when the optical head 1 operates to apply a laser beam of the reproduction level, the part of the laser beam is incident to the photo detector 21 provided in the magnetic head or the slider 4 through the magneto-optical disk or the semitransparent disk in place of it.

The output value of the photo detector 21 varies according to the slippage between the position of the main magnetic pole 2a and the optical axis of the optical head 1. Hence, by detecting the output signal of the photo detector 21, it is possible to grasp a slippage between the position of the main magnetic pole of the current magnetic head 2 and the optical head 1. In other words, by sequentially adjusting the setting position of the magnetic head so that the photo detector outputs the maximum output signal, it is possible to keep the setting position of the magnetic head against the optical axis of the optical head 1.

More particularly, in a case that the photo detectors 21a and 21b are located radially or peripherally of the disk and at equal distances from the magnetic pole of the magnetic head 2, the optical axis of the optical head 1 is matched to the main magnetic pole of the magnetic head 2 in a manner to assume the zero cross spot of the output waveform represented by taking a difference of the photo detection values of the photo detectors 21a and 21b as the optimum position. Or, if the inlet of the laser beam is formed at the main magnetic pole 2a, the optical axis is matched to the position of the main magnetic pole specified as a spot where the maximum output of the photo detector appears.

In both adjustments, the adjustment of the setting position of the magnetic head 2 is carried out by operating the fine adjustment mechanism 11 (see FIG. 1) provided in the gimbal spring 4.

In the foregoing embodiments, the magneto-optical disk apparatus arranged to require the magnetic head for applying a high-frequency magnetic field provides the fine adjustment mechanism for adjusting the setting position of the magnetic head against the optical axis of the optical head. Hence, the fine adjustment mechanism enables to adjust the position of the magnetic head more quickly and precisely than the adjustment of the mounting position of the gimbal spring against the arm.

Moreover, since plural magnetic heads are mounted adjacently in one slider, by driving the magnetic heads respectively, it is possible to set the magnetic head situated at the position where the most preferable recording and reproducing characteristics take place. This makes it easier to assemble the magneto-optical disk apparatus or do the maintenance of the apparatus.

Further, since the proper positioning of the magnetic head is executed without having to rotate the disk mounted to the magneto-optical disk apparatus, the positioning of the magnetic head can be executed easily and precisely.

Further, the magnetic head can be positioned on the reproduction signal output of the magneto-optical disk or the output signal of the photo detector provided in the magnetic head or the slider. Hence, the positioning of the magnetic head against the optical axis of the optical head can be realized with high precision.

What is claimed is:

1. A magneto-optical disk apparatus comprising;
an optical head for focusing a laser beam as a beam spot on a magnetic layer of a magneto-optical disk;
a plurality of magnetic heads for applying an external magnetic field onto said magnetic layer, said magnetic heads located as opposed to said optical head with said magneto-optical disk laid therebetween;
an arm mechanism for holding said magnetic heads; and
an adjustment mechanism for adjusting a setting position of said magnetic heads with respect to an optical axis of said optical head, wherein said magnetic heads are adjusted by way of a method, comprising the steps of:
mounting to said magneto-optical disk apparatus provided with said optical head and said magnetic heads a magnetic super resolution type magneto optical disk having a magnetic layer whose magnetism direction is inverted toward an external magnetic field when the external magnetic field of a given intensity is applied as applying a laser beam of a reproduction level,
applying the external magnetic field sequentially from each of said magnetic heads to said magneto-optical disk as applying the laser beam of the reproduction level onto said magneto-optical disk,
detecting a reproduction signal output from a signal reproduction unit provided in said magneto-optical disk apparatus, and
changing a setting position of said magnetic heads with respect to an optical axis of said optical head so that said reproduction signal output is made maximum with respect to the direction of said external magnetic field.

2. A magneto-optical disk apparatus comprising:

an optical head for focusing a laser beam as a beam spot onto a magnetic layer of a magneto-optical disk;

a plurality of magnetic heads for applying an external magnetic field onto said magnetic layer, said magnetic heads located as opposed to said optical head with said magneto-optical disk laid therebetween;

a photo detector for detecting a laser beam applied by said optical head and passed through said magneto-optical disk, said photo detector mounted in said magnetic heads or a slider for holding said magnetic heads;

an arm mechanism for holding said magnetic head; and an adjustment mechanism for adjusting a setting position of said magnetic head with respect to an optical axis of said optical head, wherein said magnetic heads are adjusted by way of a method comprising the steps of:

mounting to said magneto-optical disk apparatus provided with said optical head and said magnetic heads a magnetic super resolution type magneto-optical disk having a magnetic layer whose magnetism direction is inverted toward an external magnetic field when the external magnetic field of a given intensity is applied as applying a laser beam of a reproduction level, applying the external magnetic field sequentially from each of said magnetic heads to said magneto-optical disk as applying the laser beam of the reproduction level onto said magneto-optical disk, detecting a reproduction signal output from a signal reproduction unit provided in said magneto-optical disk apparatus, and changing a setting position of said magnetic heads with respect to an optical axis of said optical head so that said reproduction signal output is made maximum with respect to the direction of said external magnetic field.

3. The magneto-optical disk apparatus as claimed in claim 2, wherein said photo detector has a light acceptance plane directed to a disk plane of said magneto-optical disk and is mounted on a disk-opposed plane of said magnetic heads or said slider.

4. The magneto-optical disk apparatus as claimed in claim 2, further comprising an optical fiber for taking the laser beam applied by said optical head and passed through said magneto-optical disk and wherein one end of said optical fiber is located on an opposite side of said magnetic heads or said slider to said magneto-optical disk and the other end of said optical fiber is located as opposed to a light acceptance plane of said photo detector mounted in a proper portion.

5. An adjustment method of a head mechanism for a magneto-optical disk apparatus, comprising the steps of:

mounting to said magneto-optical disk apparatus provided with an optical head and magnetic heads a magnetic super resolution type magneto-optical disk having a magnetic layer whose magnetism direction is inverted toward an external magnetic field when the external magnetic field of a given intensity is applied as applying a laser beam of a reproduction level;

applying the external magnetic field sequentially from each of said magnetic heads to said magneto-optical disk as applying the laser beam of the reproduction level onto said magneto-optical disk;

detecting a reproduction signal output from a signal reproduction unit provided in said magneto-optical disk apparatus; and changing a setting position of said magnetic heads with respect to an optical axis of said optical head so that said reproduction signal output is made maximum with respect to the direction of said external magnetic field.

6. The adjustment method of a head mechanism for a magneto-optical disk apparatus as claimed in claim 5, further comprising the steps of:

after specifying the position of said magnetic heads where said reproduction signal output is made maximum with respect to the direction of said external magnetic field, operating an actuator for tracking control provided in said optical head for scanning the laser beam spot equally on the inner and the outer peripheral sides of a track from which said reproduction signal output is detected; and making sure that said magnetic heads are kept at the position where said reproduction is made maximum with respect to the direction of said external magnetic field over a given scan width.

7. The magneto-optical disk apparatus as claimed in claim 1, wherein said fine adjustment mechanism provides a piezoresistance element on a base portion of a gimbal spring for supporting said magnetic heads and serves to fine move said gimbal spring in the radial and the peripheral directions of said magneto-optical disk for fine adjusting said magnetic heads.

8. The magneto-optical disk apparatus as claimed in claim 3, wherein said photo detector is composed of a pair of photo detectors located in the radial direction of said magneto-optical disk and on both sides of a main magnetic pole of said magnetic heads and equally spaced from said main magnetic pole.

9. The magneto-optical disk apparatus as claimed in claim 3, wherein said photo detector is composed of two pairs of photo detectors located in the radial and the peripheral directions of said magneto-optical disk and on both sides of a main magnetic pole of said magnetic heads and equally spaced from said main magnetic pole.

10. An adjustment method of a head mechanism for a magneto-optical disk apparatus, comprising the steps of:

mounting to said magneto-optical disk apparatus provided with an optical head and magnetic heads a magnetic super resolution type magneto-optical disk having a magnetic layer whose magnetism direction is inverted toward an external magnetic field when the external magnetic field of a given intensity is applied as applying a laser beam of a reproduction level;

applying the external magnetic field sequentially from each of said magnetic heads to said magneto-optical disk as applying the laser beam of the reproduction level onto said magneto-optical disk;

detecting a reproduction signal output from a signal reproduction unit provided in said magneto-optical disk apparatus;

changing a setting position of said magnetic heads with respect to an optical axis of said optical head so that said reproduction signal output is made maximum with respect to the direction of said external magnetic field; and wherein the setting position of said magnetic heads is changed by operating a fine adjustment mechanism provided in an arm mechanism for holding said magnetic heads.

11. An adjustment method of a head mechanism for a magneto-optical disk apparatus comprising the steps of:

mounting a magnetic super resolution type magneto-optical disk to said magneto-optical disk apparatus having an optical head, a plurality of magnetic heads, and a photo detector provided in said magnetic heads or a slider for holding said magnetic heads and for detecting a laser beam applied by said optical head and passed through said magneto-optical disk;

detecting an output signal of said photo detector as applying a laser beam of a reproduction level onto said magneto-optical disk;

changing a setting position of said magnetic heads with respect to an optical axis of said optical head so that said output signal is made to be a predetermined value; and wherein the setting position of said magnetic heads is changed by operating a fine adjustment mechanism provided in an arm mechanism for holding said magnetic heads.

12. An adjustment method of a head mechanism for a magneto-optical disk apparatus, said magneto-optical disk apparatus comprising:

an optical head for focusing a laser beam as a beam spot on a magnetic layer of a magneto-optical disk, a plurality of magnetic heads for applying an external magnetic field onto said magnetic layer, said magnetic heads located as opposed to said optical head, and wherein a given periphery on an opposite side of said magneto-optical disk to a slider for holding said magnetic heads, said given periphery located to correspond to an area around a main magnetic pole of said magnetic heads, is formed of a highly reflective member for reflecting the laser beam applied from said optical head and passed through said magneto-optical disk; and said adjustment method of a head comprising the steps of:

mounting a magnetic super resolution type magneto-optical disk to said magneto-optical disk apparatus, detecting a laser beam highly reflected from said highly reflective member as applying the laser beam of a reproduction level onto said magneto-optical disk, and changing a setting position of said magnetic heads with respect to an optical axis of said optical head, based on said high reflection of said laser beam.

* * * * *